United States Patent
Gisler et al.

(10) Patent No.: US 12,493,011 B2
(45) Date of Patent: Dec. 9, 2025

(54) FLUID MONITORING SYSTEM FOR MONITORING A PRESENCE OR A CONDITION OF A FLUID USING ITS PERMITTIVITY AND METHOD THEREFORE

(71) Applicant: Dätwyler Schweiz AG, Schattdorf (CH)

(72) Inventors: Sven Gisler, Schattdorf (CH); Norbert Haberland, Euskirchen (DE)

(73) Assignee: Dätwyler Schweiz AG, Schattdorf (CH)

( * ) Notice: Subject to any disclaimer, the term of this patent is extended or adjusted under 35 U.S.C. 154(b) by 69 days.

(21) Appl. No.: 18/014,844

(22) PCT Filed: Jun. 3, 2021

(86) PCT No.: PCT/CH2021/050014
§ 371 (c)(1),
(2) Date: Jan. 6, 2023

(87) PCT Pub. No.: WO2022/006688
PCT Pub. Date: Jan. 13, 2022

(65) Prior Publication Data
US 2023/0273140 A1   Aug. 31, 2023

(30) Foreign Application Priority Data

Jul. 7, 2020  (CH) .................................... 00837/20

(51) Int. Cl.
*G01N 27/22* (2006.01)
*G01V 3/08* (2006.01)

(52) U.S. Cl.
CPC ......... *G01N 27/221* (2013.01); *G01N 27/228* (2013.01); *G01V 3/088* (2013.01)

(58) Field of Classification Search
CPC .... G01N 27/221; G01N 27/228; G01N 22/00; G01V 3/088; G01D 5/48; G01R 17/02
(Continued)

(56) References Cited

U.S. PATENT DOCUMENTS 6,806,808 B1 * 10/2004 Watters ..................... G01D 5/48
340/3.3
9,554,465 B1    1/2017 Liu
(Continued)

FOREIGN PATENT DOCUMENTS

CA    2797810 A1 * 11/2011 ............... F41H 1/02
CN   103140864 A  *  6/2013 ....... G06K 19/07749
(Continued)

OTHER PUBLICATIONS

Yoshitaka et al.; Translation of JP 2003016412 A; Jan. 17, 2003; Translated by EPO & Google (Year: 2003).*
(Continued)

*Primary Examiner* — Alesa Allgood
*Assistant Examiner* — Rahul Maini
(74) *Attorney, Agent, or Firm* — Fleit Intellectual Property Law; Paul D. Bianco

(57) ABSTRACT

A monitoring system monitors a presence or condition of a particular fluid in a device for storing or conducting the fluid using permittivity properties of the fluid. The system includes: the device for storing or conducting the fluid; a detector component being an integral part of the device and having a component body and a passive antenna deposited on a surface of the component body; and a reader device having a reader antenna. The reader device emits an electromagnetic output signal with a predefined output power and over a predefined frequency range via the reader antenna to the passive antenna and measures a reflected signal over the predefined frequency range, which is reflected from the passive antenna. The reader device also compares the reflected signal with at least one reference signal of at least one reference fluid to determine the presence or the condition of the particular fluid.

17 Claims, 2 Drawing Sheets

(58) Field of Classification Search
USPC ....... 324/652, 655, 656, 658, 660, 663, 664, 324/667, 668, 674, 675, 681, 682, 686, 324/689
See application file for complete search history.

(56) References Cited

U.S. PATENT DOCUMENTS

| | | | |
|---|---|---|---|
| 10,165,689 | B1 | 12/2018 | Atwood |
| 10,233,870 | B2 | 3/2019 | Gisler |
| 10,830,184 | B2 | 11/2020 | Haberland |
| 2008/0061945 | A1 | 3/2008 | Hoshina |
| 2009/0210169 | A1* | 8/2009 | Potyrailo ........... G01N 33/1886 702/57 |
| 2011/0094676 | A1 | 4/2011 | Husemann |
| 2015/0033823 | A1* | 2/2015 | Blumberg, Jr. ........ G01N 22/00 73/19.03 |
| 2015/0072097 | A1* | 3/2015 | Tobol .................... B31D 1/027 156/289 |
| 2016/0091544 | A1 | 3/2016 | Daneshmand |
| 2016/0192474 | A1 | 6/2016 | Niskala |
| 2017/0211514 | A1 | 7/2017 | Gisler |
| 2017/0284968 | A1 | 10/2017 | Blumberg |
| 2017/0292920 | A1 | 10/2017 | Torun |
| 2018/0042479 | A1 | 2/2018 | Yalcinkaya |
| 2018/0174015 | A1 | 6/2018 | Destraves |
| 2018/0192874 | A1 | 7/2018 | Werner et al. |
| 2018/0284034 | A1* | 10/2018 | Torun ..................... G01N 22/00 |
| 2018/0328314 | A1 | 11/2018 | Haberland |
| 2019/0298234 | A1 | 10/2019 | Omenetto |
| 2020/0108672 | A1 | 4/2020 | Hosomi |
| 2020/0264122 | A1* | 8/2020 | Reuel ................. G01N 27/226 |
| 2023/0300988 | A1 | 9/2023 | Vrijens |
| 2023/0333082 | A1 | 10/2023 | Gisler |

FOREIGN PATENT DOCUMENTS

| | | | |
|---|---|---|---|
| DE | 10 2008 006390 A1 | 7/2009 | |
| EP | 1522957 A1 | 4/2005 | |
| EP | 3 578 395 A1 | 12/2019 | |
| EP | 3632666 A1 | 4/2020 | |
| JP | 2003016412 A * | 1/2003 | |
| JP | 2009066762 A * | 4/2009 | |
| JP | 2015-228533 A | 12/2015 | |
| JP | 2016-114541 A | 6/2016 | |
| WO | 2009/120231 A1 | 10/2009 | |
| WO | 2013/188443 A2 | 12/2013 | |
| WO | WO-2016012233 A1 * | 1/2016 | .......... B01F 3/04021 |
| WO | 2017/121668 A1 | 7/2017 | |
| WO | 2018/226782 A1 | 12/2018 | |
| WO | 2019/036812 A1 | 2/2019 | |
| WO | WO-2019173264 A1 * | 9/2019 | ............. G01N 22/00 |
| WO | 2020/040709 A1 | 2/2020 | |

OTHER PUBLICATIONS

Salim et al.; "Complementary Split-Ring Resonator-Loaded Microfluidic Ethanol Chemical Sensor"; Oct. 28, 2016; Sensors; vol. 16 (Year: 2016).*
Kenji; Translation of JP-2009066762; Apr. 2, 2009; Clarivate Analytics (Year: 2009).*
Song-zhou; Translation of CN 103140864 A; Jun. 5, 2013; Clarivate Analytics (Year: 2013).*
Chung et al.; "Inkjet-printed stretchable silver electrode on wave structured elastomeric substrate"; Pub. Date Apr. 13, 2011; Applied Physics Letters; 98; pp. 1-3 (Year: 2011).*
Gisler et al.; Translation of WO 2016/012233 A1; Pub. Date Jan. 28, 2016; Translated by Clarivate (Year: 2016).*
International Search Report and Written Opinion for PCT/CH2021/050012, filed Jun. 30, 2021.
International Preliminary Report on Patentability with Written Opinion for PCT/CH2021/050012, filed Jun. 30, 2021.
International Preliminary Report on Patentability with Written Opinion for PCT/CH2021/050013, filed Jun. 30, 2021.
International Preliminary Report on Patentability with Written Opinion for PCT/CH2021/050014, filed Jun. 30, 2021.
International Search Report and Written Opinion for PCT/CH2021/050013, filed Jun. 30, 2021.
International Search Report and Written Opinion for PCT/CH2021/050014, filed Jun. 30, 2021.
Restriction Requirement dated Aug. 30, 2024 for U.S. Appl. No. 18/014,831.

* cited by examiner

FLUID MONITORING SYSTEM FOR MONITORING A PRESENCE OR A CONDITION OF A FLUID USING ITS PERMITTIVITY AND METHOD THEREFORE

TECHNICAL FIELD

The invention relates to a fluid monitoring system for monitoring a presence or a condition of a particular fluid in a device for storing or conducting the fluid using the permittivity properties of said fluid and a method for monitoring the presence or the condition of said fluid. It further refers to a sealing component for such a fluid monitoring system.

BACKGROUND

A split-ring resonator is a structure of electrically conductive, nonmagnetic material with a gap in the ring. It is mainly used as arrays on metamaterials to alter their properties. A split-ring resonator may also be used to measure certain conditions of the material or the environment surrounding the material.

WO20040709 describes a contact lens embedded sensor system for monitoring ocular hypertension and glaucoma conditions. The contact lens has an embedded sensor comprising at least two split-ring resonator type resonator rings. An antenna is coupled to the contact lens for communication with an electronic readout device to measure resonance frequencies of the sensor. The system is configured to determine deformations of the contact lens and the embedded sensor due to intraocular pressure. US2018042479 relates to a similar split-ring resonator-based strain sensor on flexible substrates such as a contact lens to detect intraocular pressure changes.

US2019298234 describes a dielectric sensor comprising at least one split-ring resonator configured to be positioned within an oral cavity of the subject and to be bioresponsive to at least one physiological variable such as glucose concentration, ethanol concentration, salinity, pH. and temperatures. The split-ring resonator may comprise a first resonator loop, a second resonator loop arranged in a split-ring resonator formation with the first resonator loop, and a dielectric interlayer interposed between and contacting the first resonator and the second resonator.

WO19036812 describes a sensor and method for use in measuring a physical characteristic of a fluid in a microfluidic system. A microfluidic chip has a thin deformable membrane that separates a microfluidic channel from a microwave resonator sensor. The membrane is deformable in response to loading from interaction of the membrane with the fluid. Loading may be fluid pressure in the channel, or shear stress or surface stress resulting from interaction of the membrane with the fluid. The deformation of the membrane changes the permittivity in the region proximate the sensor. A change in permittivity causes a change in the electrical parameters of the sensor, thereby allowing for a characteristic of the fluid, such as flow rate, or a biological or chemical characteristic, to be measured. Also, a microwave sensor with improved sensitivity for characterizing a fluid in a microfluidic channel is provided. The sensor has a rigid and very thin layer, for example in the range of µm to 100 µm, in the microfluidic chip allowing for the positioning of the sensor very close to the microfluidic channel, which enables very high resolution sensing.

US2017284968 describes an apparatus for detecting at least one condition of interest relating to a tube, e.g. the presence of an air bubble. In some embodiments, the sensor includes antennas, a split-ring resonator, a frequency generator capable of generating frequencies in the microwave range, and a detection component. The detection component may estimate at least one parameter of received microwave energy in order to determine if a condition of interest exists.

US2016091544 relates generally to sensors for sensing chemical and physical properties of a sample or an environment, and more particularly to sensors comprising a microwave planar split-ring resonator. A planar split-ring resonator detects the variation in a nearby medium through variations in the electric field above a substrate of the resonator. A sample is positioned in relation to a coupling gap of the resonator.

SUMMARY OF THE INVENTION

It is an objective of the invention to provide a fluid monitoring system comprising a detector or sensor component and a reader device for monitoring a presence or a condition of a particular fluid in a pre-existing device, wherein an integral component body of the pre-existing device can be modified to be the detector or sensor component of the fluid monitoring system. It is another object of the invention to provide a fluid monitoring system to detect or distinguish different particular fluids. It is another object of the invention to provide a fluid monitoring system to detect possible leakage of the fluid or to detect the presence of an undesired fluid or to detect alteration of a fluid within a device to control stability, storage life or wear of the fluid.

At least one of the objectives of the present invention is achieved by a fluid monitoring system as disclosed herein and a sealing component as also disclosed herein.

The fluid monitoring system for monitoring a presence or a condition of a particular fluid in a device for storing or conducting the fluid using the permittivity properties of the fluid comprises: the device for storing or conducting the fluid; a detector component with a component body and a passive antenna, preferably in the form of a split-ring resonator, which is deposited on a surface of the component body; and a reader device (e.g. a network analyzer) comprising a reader device antenna. The reader device is adapted to emit an electromagnetic output signal with a predefined output power and over a predefined frequency range via the reader device antenna to the passive antenna of the detector component and to measure a reflected signal over the predefined frequency range, which is reflected form the passive antenna. The reader device is further adapted to compare the measured reflected signal with at least one reference signal of at least one known reference fluid to determine the presence or the condition of the particular fluid in the device.

By comparing the measured signal of the particular fluid with the reference signal of a known reference fluids it is possible to determine the actual fluid present in the device, e.g. if the actual fluid is the desired fluid or not, or to determine if the fluid in the device deteriorated over time, e.g. in the case of pharmaceutical products or food products. The at least one reference signal may be a library of reference signals of known reference fluids including the particular fluid and e.g. known un-desired fluids or deteriorated states of the particular desired fluid.

The detector component may be a sealing component of the device. A sealing component is understood as a component of the device that provides a fluid seal within the device, e.g. between two parts of the device. The invention is based on the idea, that most devices for storing or conducting a particular fluid also include a sealing component of elastomeric material or other material e.g. a membrane made of plastic selected from the group of polybenzimidazole (PBI), polyimide (PI), thermoplastic polyimide (TPI), polyamide-imide (PAI), polyethersulfone (PES), polyphenylene sulfon (PPSU), polyetherimide (PEI), polysulfone (PSU), polyetherketone (PEK), polyaryletherketone (PAEK), polyphenylene sulfide (PPS), perfluoroalkoxy polymer (PFA), ethylene tetrafluoroethylene (ETFE), polychlortrifluoroethylene (PCTFE), polyvinylidenefluoride (PVDF), polybuteneterephthalate (PBT) or polyetheretherketone (PEEK), which has at least one surface facing the fluid and being in contact with the fluid. By providing the seal with a passive antenna such a component can be cost-efficiently manufactured and be integrated in existing devices. Preferably, the passive antenna is on the surface facing the fluid. However, a sealing membrane may be even thin enough to place the passive antenna on the surface facing away from the fluid if the permittivity of fluid is still detectable. An example of such a sealing membrane is described in WO2016012233 or WO2017121668 from the same applicant. In another application the passive antenna may be arranged on the "dry side" (i.e. the side facing away from the fluid) membrane for pumping or dosing a fluid even if the membrane is too thick for measuring the permittivity of the conducted fluid. Such an arrangement may be used to detect the presence of a particular fluid on that "dry" side, e.g. for leak detection.

The reader device may be adapted to calculate the reflection coefficients over the predefined frequency range using the reflected signal and the output signal. The reflection coefficient, often referred to as S11 and given in dB, is the ration of a response or reflected signal, which is reflected from the passive antenna over the output signal. Changes in permittivity of the fluid near the detector or sensor component alters the resonance frequency of the split-ring resonator, by changing the electric field around the split-ring resonator, which in turn leads to changes in the reflected signal. To alter the resonance frequency, the fluid does not necessarily need to directly contact the passive antenna.

The monitoring system may be used to detect desired or non-desired fluids within a device. A non-desired fluid may be a fluid, which may damage the elastomeric material of the sealing component, or a wrong fluid (e.g. petrol instead of diesel; or gasoline instead of add-blue, wrong medication or liquid in a pharmaceutical or medical device) or undesired fluids filled in the device or passing through the device. The monitoring system may be used to monitor stability, storage life or wear of a fluid within a device, by detecting alteration of the fluid compared to its original state or properties.

The term "device" is herein also understood as a container e.g. for medication. The terms sensor and detector are used synonymously.

Further embodiments of the invention are also disclosed herein.

In some embodiments the elastomeric material of the component body may be a thermoset elastomer or a thermoplastic elastomer. The elastomeric material can be, for example, a synthetic or natural rubber, such as butyl rubber, isoprene rubber, butadiene rubber, halogenated butyl rubber (e.g., bromobutyl rubber), ethylene propylene terpolymer, silicone rubber, fluoro- or perfluoroelastomers, chlorosulfonate, polybutadiene, butyl, neoprene, nitrile, polyisoprene, buna-N, copolymer rubbers such as ethylene-propylene (EPR), ethylene-propylene-diene monomer (EPDM), acrylonitrile-butadiene (NBR or HNBR) and styrene-butadiene (SBR), blends such as ethylene or propylene-EPDM, EPR, or NBR, combinations thereof. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyolefins, polyesters, ethylene vinyl acetates, fluoropolymers, and polyvinyl chloride.

In some embodiments the detector component may be a sealing component for the device containing, conducting, or processing the fluid and the surface of the sealing component may be facing said fluid.

In some embodiments the passive antenna is a double split-ring resonator with two concentrically arranged rings, preferably circular rings. A double split-ring resonator (SRR) has a pair of enclosed loops made of nonmagnetic metal with splits or small gaps in them at opposite sides. The loops can be concentric, or square, and gapped as needed. A magnetic flux penetrating the metal rings will induce rotating currents in the rings, which produce their own flux to enhance or oppose the incident field (depending on the SRRs resonant properties). This field pattern is dipolar. The small gaps between the rings produce large capacitance values which lower the resonating frequency.

The geometrical parameter of the double split-ring resonator may be in the following ranges: radius of outer ring r: 30 to 60 mm, preferably about 46 mm; width of outer ring w1: 1 to 3 mm, preferably about 2 mm; width of inner ring w2: 1 to 3 mm, preferably about 2 mm; width of gap between rings wg: 1 to 3 mm, preferably 1.8 mm; gap size of outer ring d1: 1 to 3 mm, preferably about 1.8 mm; gap size of inner ring d2: 1 to 3 mm, preferably about 1.8 mm; layer thickness of rings h: 10 to 100 micrometres.

In some embodiments the passive antenna may be deposited by printing, e.g. using known printing technologies such as screen printing, flexographic printing, gravure printing, relief printing, inkjet printing, piezo-inkjet printing, aerosol jet printing, stencil printing, offset printing, doctor blade printing, rotary screen printing, intaglio printing, digital printing, capillary printing, electrohydrodynamic printing, tampography, microcontact printing, laser printing, coating or laminating technologies.

In some embodiments the material for the passive antenna may be selected from the group of conductive polymers, carbon, organic/metallic compounds, metal precursors, and metal nanopowders. Preferably, the material of the booster antenna is a stretchable material, e.g. a stretchable silver ink. The material may be selected from metal inks and/or metal-salt inks, such as Ag/AgCl, Cu and Ni, non-metal inks, e.g. carbon based inks (graphene, carbon nano tube), PEDOT:PSS and combinations thereof. The material may be combined with stretchable carrier materials such as polysiloxane or PU or fluoroelastomer. Good results have been achieved with a silver-siloxane polymer composition.

In some embodiments the passive antenna deposited on the surface of the component body may be covered with a dielectric layer of a dielectric foil or a dielectric ink or lacquer different to the material of the component body. Dielectric inks are typically composed of organic polymers or ceramics in solvents. Novel insulating 2D nanomaterials such as hexagonal boron nitride further offer temperature and electrochemical stability. Dielectric foils may be composed of organic polymers and may include ceramic powder. The material of the passive antenna may be a stretchable material, e.g. a stretchable ink or paste. Good results have been achieved with dielectric ink based on a siloxane polymer composition filled with aluminium oxide resulting in a semi-transparent and stretchable film.

In some embodiments the predefined frequency range of the output signal may be 400 MHZ to 1600 MHZ, preferably 800 MHz to 1000 MHZ, or around 2.4 GHz and/or the predefined power of the output signal may be adjusted to obtain good reflection signals. The frequency range also depends on restriction of respective authorities.

In some embodiments the reader device antenna of the reader device may be a circularly polarized antenna.

In some embodiments the at least one reference signal is at least one predetermined reflection signal for air, water, or any fluid, which is a desired or a non-desired fluid in the device. Accordingly, calculated reflection coefficients may be used as reference.

In some embodiments the device for storing or conducting the particular fluid may be a storage container or a device for dosing or pumping a fluid.

The invention further relates to a sealing component for a fluid monitoring system, wherein the sealing component is the detector component of the device for storing or conducting the fluid, and comprises a component body made of an elastomeric material, preferably a thermoset elastomer or a thermoplastic elastomer, or of a membrane of plastic selected from the group of polybenzimidazole (PBI), polyimide (PI), thermoplastic polyimide (TPI), polyamideimide (PAI), polyethersulfone (PES), polyphenylene sulfon (PPSU), polyetherimide (PEI), polysulfone (PSU), polyetherketone (PEK), polyaryletherketone (PAEK), polyphenylene sulfide (PPS), perfluoroalkoxy polymer (PFA), ethylene tetrafluoroethylene (ETFE), polychlortrifluoroethylene (PCTFE), polyvinylidenefluoride (PVDF), polybuteneterephthalate (PBT) or polyetheretherketone (PEEK), and a passive antenna, preferably in the form of a split-ring resonator, which is deposited on a surface of the component body. The sealing component may be provided with the features as described above.

The invention further relates to a method for monitoring a presence or a condition of a particular fluid in a device for storing or conducting the fluid using the fluid monitoring system as described above, comprising the steps of a.) emitting an electromagnetic output signal with a predefined output power and over a predefined frequency range via the reader device antenna to the passive antenna of the detector component; b.) measuring a reflected signal reflected from the passive antenna; c.) comparing the measured reflected signal with at least one reference signal of at least one known reference fluid to determine the presence or the condition of the particular fluid in the device.

The reflection coefficients over the predefined frequency range may be calculated using the reflected signal and the output signal and then be used to compare it with a reference set of reflection coefficients.

BRIEF DESCRIPTION OF THE DRAWINGS

The invention is described in greater detail below with reference to embodiments that are illustrated in the figures. The figures show.

EMBODIMENTS OF THE INVENTION

Figure 1:
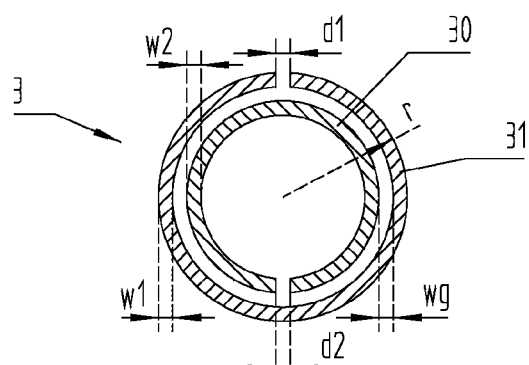
FIG. 1 a passive antenna of a fluid monitoring system in the form of a double split-ring resonator with two concentrically arranged rings.
Figure 2:
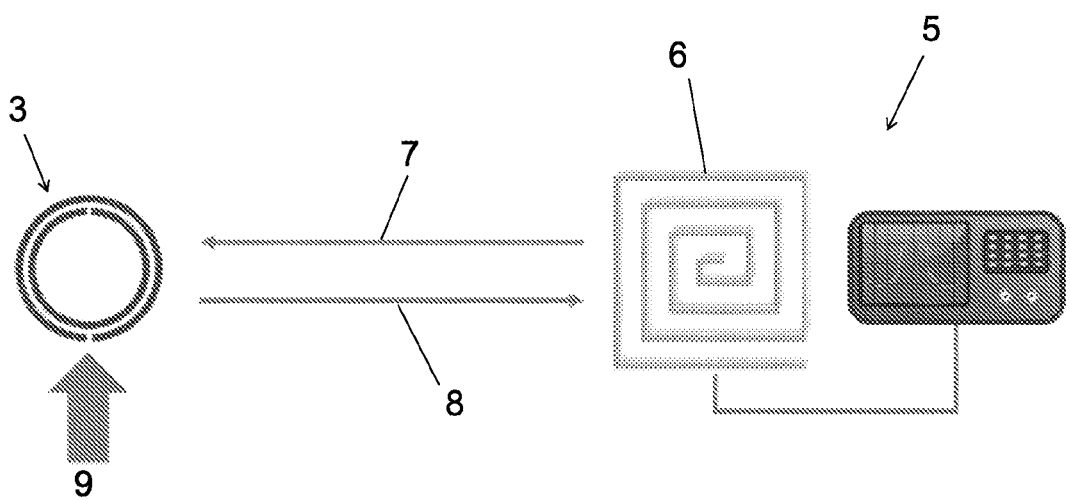
FIG. 2 a schematic representation of a fluid monitoring system.

FIG. 1 shows an example of a circular double split-ring resonator with two concentric split-rings 30, 31, which may be used as passive antenna 3 in a fluid monitoring system as depicted in FIG. 2.

The geometrical parameter of the double split-ring resonator may be in the following ranges: radius of outer ring r: 30 to 60 mm, preferably about 46 mm; width of outer ring w1: 1 to 3 mm, preferably about 2 mm; width of inner ring w2: 1 to 3 mm, preferably about 2 mm; width of gap between rings wg: 1 to 3 mm, preferably 1.8 mm; gap size of outer ring d1: 1 to 3 mm, preferably about 1.8 mm; gap size of inner ring d2: 1 to 3 mm, preferably about 1.8 mm; layer thickness of rings h: 10 to 100 micrometres.

The fluid monitoring system comprises a detector or sensor component 1 including the passive antenna 3 and a reader device 5, which can emit an electromagnetic output signal 7 with a predefined output power and over a predefined frequency range. The output signal 7 is emitted via a reader device antenna 6 of the reader device 5, which is typically in the form of a circular polarized antenna. The reader device 5 may include a network analyser.

The reflected signal 8, which is reflected from the passive antenna 3 depends on the resonance frequencies of the passive antenna 3, which in turn is affected by the fluid 9 present near the passive antenna 3. The permittivity of the fluid 9 influences the electric field between the rings 30, 31 and thereby changes the resonance frequencies. The changes of resonance frequencies are best seen by so called reflection coefficients measured of the emitted frequency range (see FIG. 4).

Figure 4:
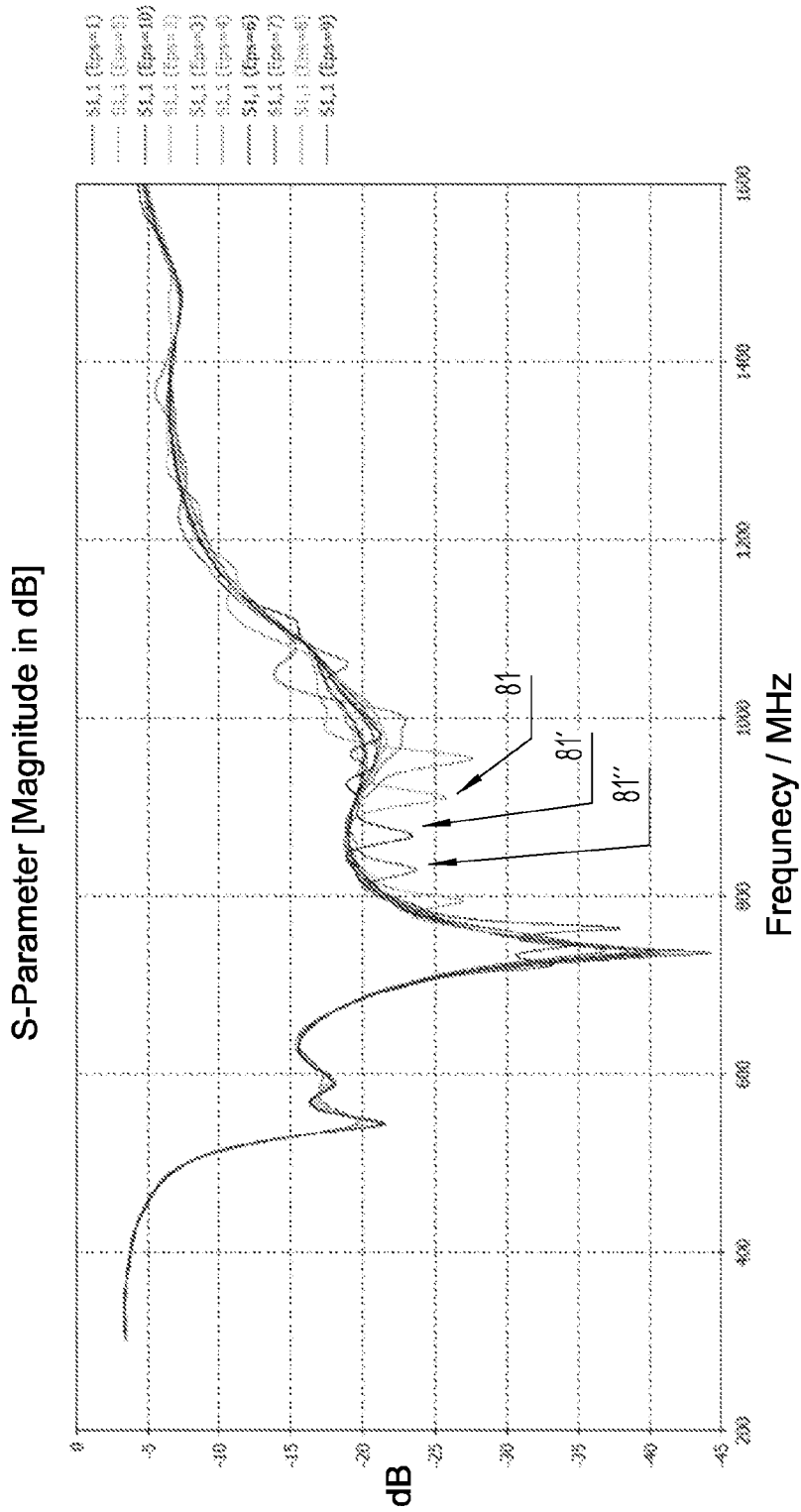
FIG. 4 a graph with different reflection measurements for different fluids.

The reader device calculates the reflection coefficients over the predefined frequency range using the reflected signal 8 and the output signal 7. The reflection coefficient, often referred to as S11 and given in dB, is the ratio of the reflected signal 8 over the output signal 7. Changes in permittivity of the fluid near the passive antenna alters the resonance frequency of the split-ring resonator, by changing the electric field around the split-ring resonator, which in turn leads to shifts in resonance peaks 81, 81', 81" as shown in the graph of FIG. 4. The resonance peaks 81, 81', 81" in FIG. 4 refer to different fluid samples. These signals may be used as known reference signals in a library of reference signals for comparison with the measured signal of the particular fluid in the device.

In general, the parameters of the passive antenna 3 are set to obtain a high responsiveness of the output signal or reflection coefficient in a predefined frequency range, typically 400 MHz to 1600 MHZ, preferably 800 MHz to 1000 MHz, or around 2.4 GHz. The frequency range also depends on restriction of respective authorities. The power of the output signal is adjusted to obtain good reflection signals.

Figure 3:
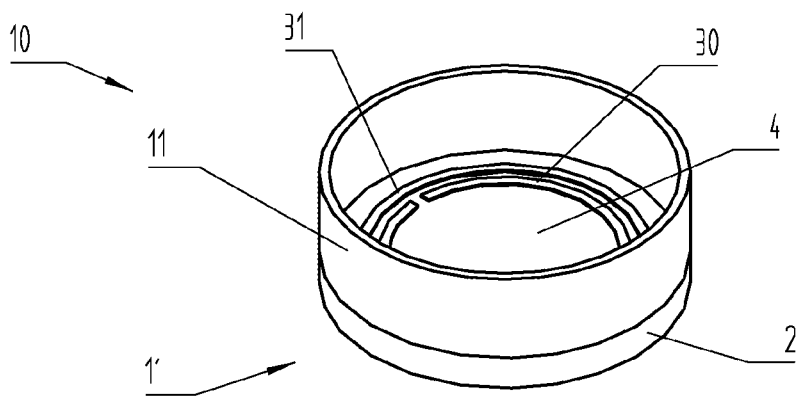
FIG. 3 a test container for monitoring a fluid using the fluid monitoring system.

FIG. 3 shows a simple device 10 or container for measuring the reflection coefficients of the fluid 9 using the fluid monitoring system. The device 10 comprises a container wall 11 and the sensor or detector component 1.

The detector component 1 comprises a component body 2 and the passive antenna 3, which is deposited on a surface 4 of the component body 2, which is facing to the fluid 9. If the component body 2 is made of elastomeric material, the detector component 1 may be used as sealing component in a device 10.

REFERENCE SIGNS 1 detector component, sensor component
2 component body
3 passive antenna
30 split-ring resonator
31 split-ring resonator
4 surface
5 reader device
6 reader device antenna
7 output signal
8 reflected signal
9 fluid
10 device (containing, conducting or processing fluid)
11 container wall
81, 81', 81" resonance peak

The invention claimed is:

1. A fluid monitoring system for monitoring a presence or a condition of a fluid in a device for storing or conducting the fluid using permittivity properties of the fluid, the fluid monitoring system comprising:
the device for storing or conducting the fluid;
a detector component being a sealing component of the device configured for providing a fluid seal of the device to thereby prevent leaking and having at least one surface facing the fluid, the detector component being formed by a component body made of a thermoset elastomer or a thermoplastic elastomer and having a passive antenna deposited on a surface of the component body; and
a reader device having a reader device antenna,
wherein the reader device is configured for emitting an electromagnetic output signal with a predefined output power and over a predefined frequency range via the reader device antenna to the passive antenna of the detector component and configured for measuring a reflected signal over the predefined frequency range, the reflected signal reflected from the passive antenna, and
wherein the reader device is further configured for comparing the measured reflected signal with at least one reference signal of at least one known reference fluid to determine the presence or the condition of the fluid in the device.

2. The fluid monitoring system according to claim 1, wherein the reader device is configured for calculating reflection coefficients over the predefined frequency range using the reflected signal and the electromagnetic output signal.

3. The fluid monitoring system according to claim 1, wherein the passive antenna is a double split-ring resonator having two concentrically arranged rings.

4. The fluid monitoring system according to claim 1, wherein the passive antenna has been deposited on the surface of the component body by at least one of printing, coating, and laminating technologies.

5. The fluid monitoring system according to claim 1, further comprising a dielectric layer covering the passive antenna, the dielectric layer made of a different material than the material of the component body.

6. The fluid monitoring system according to claim 5, wherein the material different from the material of the component body is at least one of a dielectric foil, a dielectric ink, and a lacquer.

7. The fluid monitoring system according to claim 1, wherein the passive antenna is made of a stretchable material.

8. The fluid monitoring system according to claim 1, wherein the predefined frequency range of the electromagnetic output signal is 400 MHz to 1600 MHz or about 2.4 GHz.

9. The fluid monitoring system according to claim 1, wherein the reader device antenna is a circularly polarized antenna.

10. The fluid monitoring system according to claim 1, wherein the at least one reference signal is at least one predetermined reflection signal for air, water, or any fluid, which is a desired or non-desired fluid in the device.

11. The fluid monitoring system according to claim 1, wherein the device for storing or conducting the fluid is a storage container or a device for dosing or pumping a fluid.

12. The fluid monitoring system according to claim 1, wherein the passive antenna is formed as a split-ring resonator.

13. The fluid monitoring system according to claim 1, wherein the passive antenna is made of a stretchable ink or paste.

14. The fluid monitoring system according to claim 1, wherein the sealing component is configured for providing a fluid seal between two parts of the device.

15. The fluid monitoring system according to claim 1, wherein the at least one surface of the fluid seal facing the fluid is in contact with the fluid.

16. A method for monitoring a presence or a condition of a fluid in a device for storing or conducting the fluid using a fluid monitoring system, the method comprising:
a emitting an electromagnetic output signal with a predefined output power and over a predefined frequency range of 400 to 1600 MHz via a reader device antenna to a passive antenna of a detector component of the fluid monitoring system;
b. measuring a reflected signal reflected from the passive antenna over the predefined frequency range of 400 to 1600 MHZ; and
c. comparing the measured predefined frequency range of 400 to 1600 MHz of the reflected signal with at least one reference signal of at least one known reference fluid to determine the presence or the condition of the fluid being monitored in the device;
wherein the at least one reference signal is from a library of reference signals measured over the predefined frequency range of known reference fluids including the fluid being monitored in the device and known undesired fluids or deteriorated states of the fluid being monitored in the device.

17. The method according to claim 16, wherein reflection coefficients over the predefined frequency range are calculated using the reflected signal and the electromagnetic output signal.

* * * * *